United States Patent
Bair et al.

[11] 3,889,556
[45] June 17, 1975

[54] SAW BAR MOUNTED SHARPENER FOR CHAIN SAWS

[76] Inventors: Howard C. Bair; Richard C. Larsen, both of 2171 S.E. 130th Ave., Portland, Oreg. 97233

[22] Filed: Apr. 1, 1974

[21] Appl. No.: 456,739

Related U.S. Application Data

[63] Continuation-in-part of Ser. No. 323,958, Jan. 15, 1973, abandoned.

[52] U.S. Cl.............................................. 76/25 A
[51] Int. Cl............................................. B23d 63/00
[58] Field of Search................................... 76/25 A

[56] References Cited
UNITED STATES PATENTS

| | | | |
|---|---|---|---|
| 2,729,987 | 1/1956 | Bluemink | 76/25 A |
| 2,792,724 | 5/1957 | Durall | 76/25 A |
| 2,824,468 | 2/1958 | Nielsen | 76/25 A |
| 2,833,165 | 5/1958 | Irwin et al. | 76/25 A |
| 3,313,184 | 4/1967 | Granberg | 76/25 A |
| 3,465,795 | 9/1969 | Tupper | 76/25 A |
| 3,527,122 | 9/1970 | Oehrli | 76/25 A |

FOREIGN PATENTS OR APPLICATIONS

| | | | |
|---|---|---|---|
| 455,128 | 3/1949 | Canada | 76/25 A |

*Primary Examiner*—Harrison L. Hinson
*Attorney, Agent, or Firm*—Eugene M. Eckelman

[57] ABSTRACT

A mounting bracket is arranged to be attached to the bar of a chain saw and supports a sharpening element holder through the medium of a head secured laterally to the bracket. The sharpening elements are mounted on the underside of the holder, and a pivotal guide rail is mounted on the holder for directing the cutter elements of the chain properly into the sharpening elements. The holder has auxiliary guide portions arranged for engagement by a depth gauge portion of the cutter elements to take the impact off the latter as they move toward the sharpening elements. The sharpening elements are shaped to sharpen cutter elements having inside surfaces and are arranged symmetrically to sharpen oppositely facing cutter elements. A brake, comprising a pair of friction rollers arranged to clamp against opposite sides of the chain to control the speed of the chain, may be supported on the mounting bracket.

12 Claims, 16 Drawing Figures

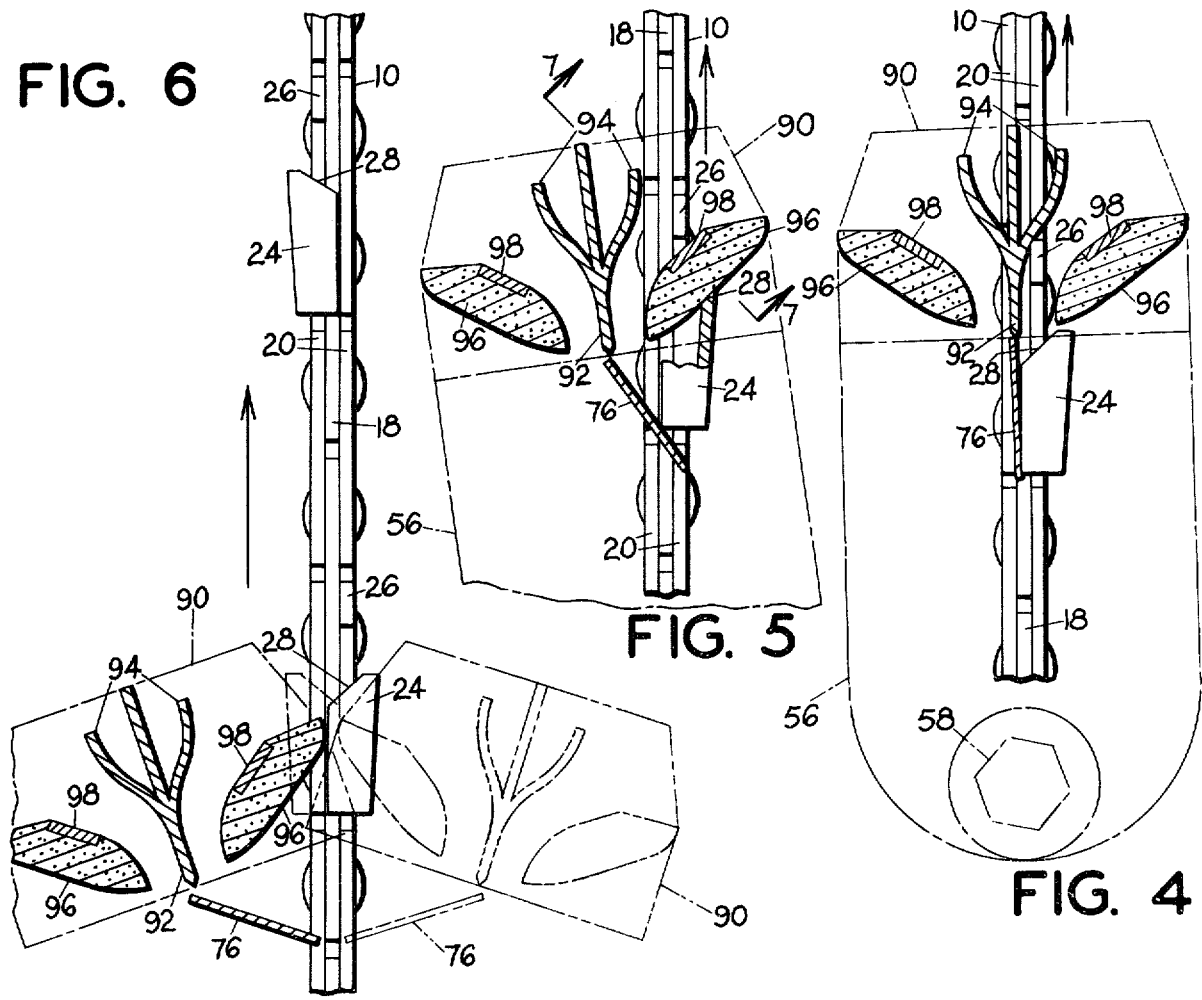
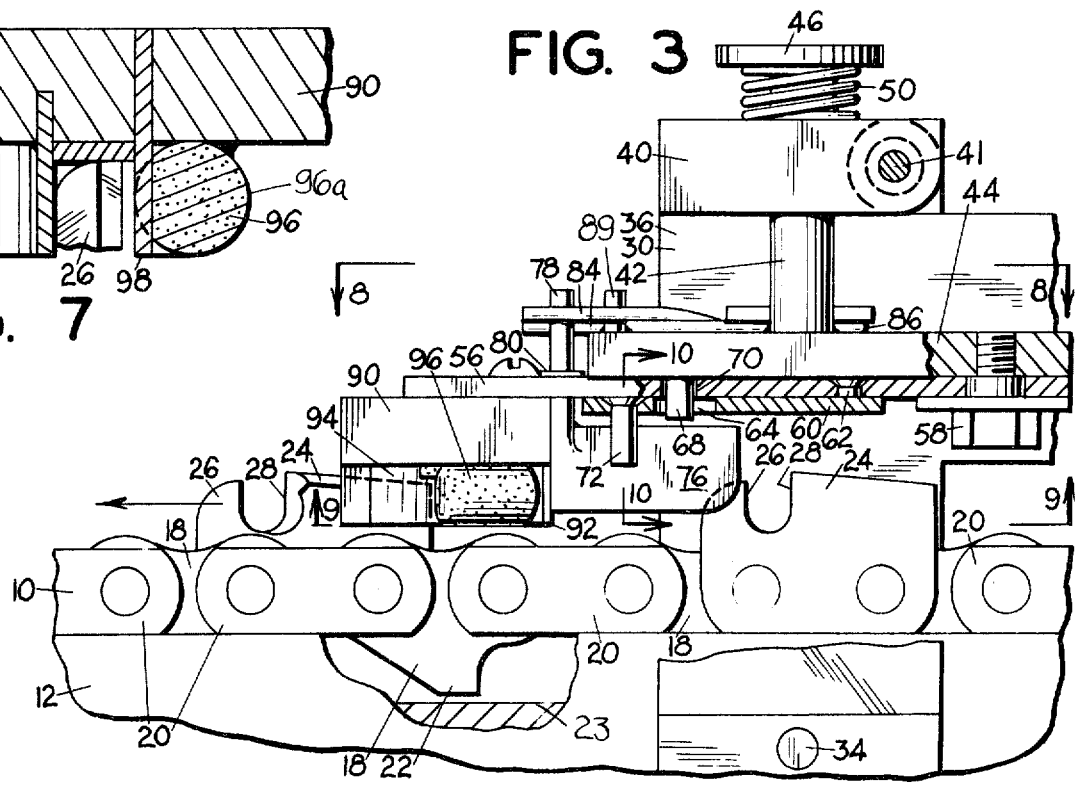

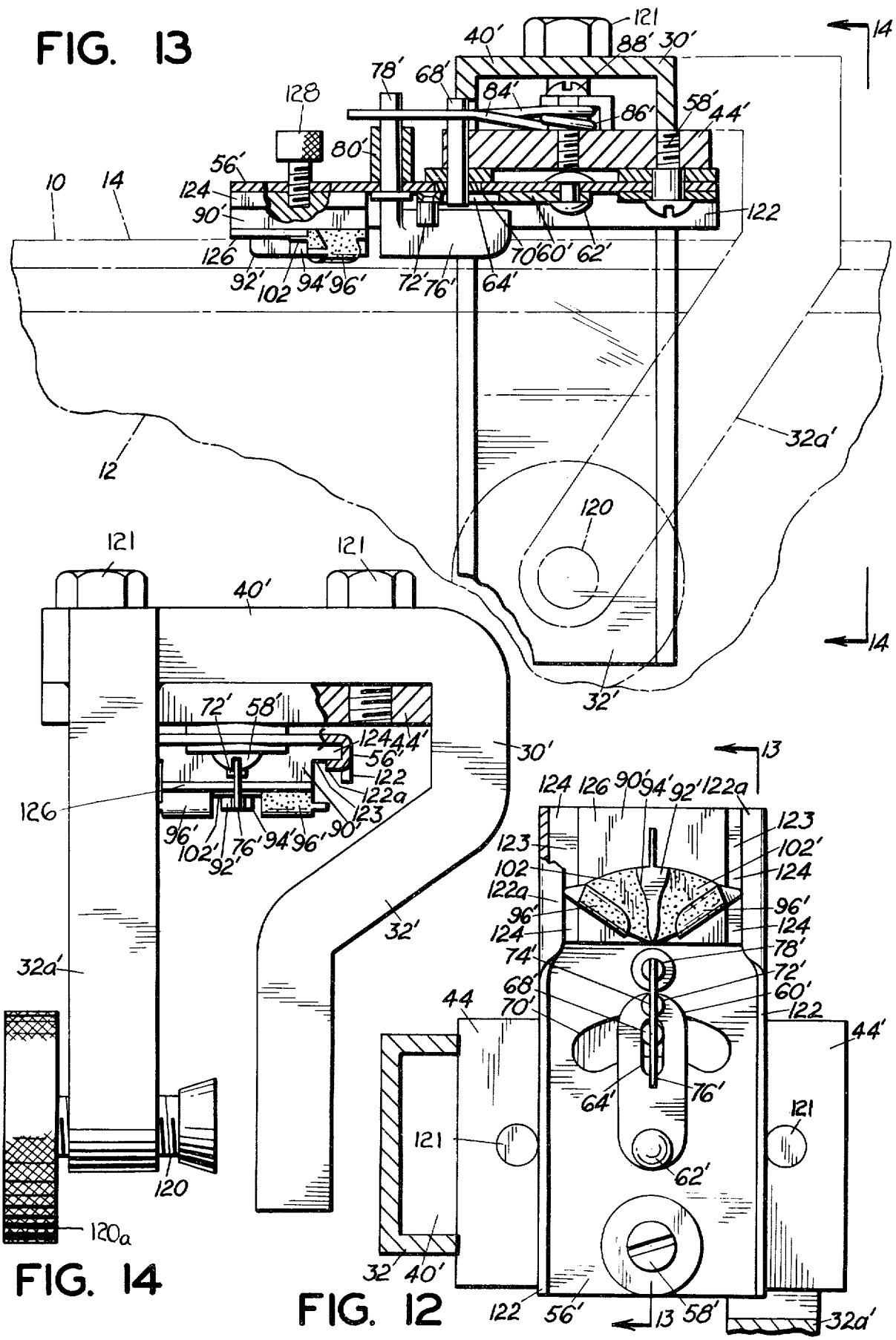

3,889,556

PATENTED JUN 17 1975

SHEET 5

3,889,556

SAW BAR MOUNTED SHARPENER FOR CHAIN SAWS

REFERENCE TO PRIOR APPLICATIONS

This is a continuation-in-part of application Ser. No. 323,958, filed Jan. 15, 1973 now abandoned for Saw Bar Mounted Sharpener For Chain Saws.

BACKGROUND OF THE INVENTION

This invention relates to a sharpener for saw chains and particularly to such a sharpener which is mounted on the chain saw so that the chain can be sharpened by movement thereof around the bar.

Saw chain sharpeners have heretofore been provided which are mounted directly on the chain saw so that the chain does not have to be taken off the bar to be sharpened. The sharpeners heretofore provided are mounted on the housing of the chain saw and have the disadvantage that they add size to the saw and thus make them more cumbersome to handle. U.S. Pat. Nos. 3,487,591, 3,529,495, and 3,534,638 are examples of this type of sharpener.

Such sharpeners also have the disadvantage that they cannot sharpen a common type of chain, namely, that type having an L or hook-shaped cutter element wherein the cutting surfaces are on the inside. The prior devices have simply employed arcuate stones or other abrasive means mounted on the saw housing, and such sharpening elements engage only a top cutting edge of the tooth. These structures are designed to sharpen the one type of tooth, namely, the top sharpening type of tooth. Since the L or hook-shaped cutter element type chain is in popular demand, the prior sharpening structures do not meet the needs of the trade.

SUMMARY OF THE INVENTION

According to the present invention, a sharpener for chain saws is provided which employs a novel structure making it capable of sharpening saw chain cutter elements of the type having L or hook-shaped cutting surfaces.

Another object is to provide such apparatus which is capable of attachment to the bar of the saw. This structure accomplishes the important advantage that the saw housing is not encumbered by additional mechanism.

Another object is to provide a sharpener for chain saws which is capable of sharpening saw chains in which adjacent teeth face in opposite directions.

Another object is to provide a sharpener of the type described which is easily adaptable to existing chain saws.

Still another object is to provide a sharpener of the type described employing a brake operative on the chain to provide the desired speed of the chain as it is being sharpened.

Yet another object is to provide a device of the type described which is simplified in construction and inexpensive to manufacture.

BRIEF DESCRIPTION OF THE DRAWINGS

FIG. 3 is an elevational view, partly broken away, taken on the line 3—3 of FIG. 2;

FIGS. 4, 5 and 6 are views taken on the line 6—6 of FIG. 2 and show different steps in a sharpening process;

FIG. 7 is a fragmentary enlarged sectional view taken on the line 7—7 of FIG. 5;

FIG. 12 is a bottom plan view of a second embodiment of the present apparatus, a portion of this view being shown in section;

FIG. 13 is a longitudinal sectional view taken on the line 13—13 of FIG. 12;

FIG. 14 is an end elevational view taken on the line 14—14 of FIG. 13;

DETAILED DESCRIPTION OF A PREFERRED EMBODIMENT

Figure 1:
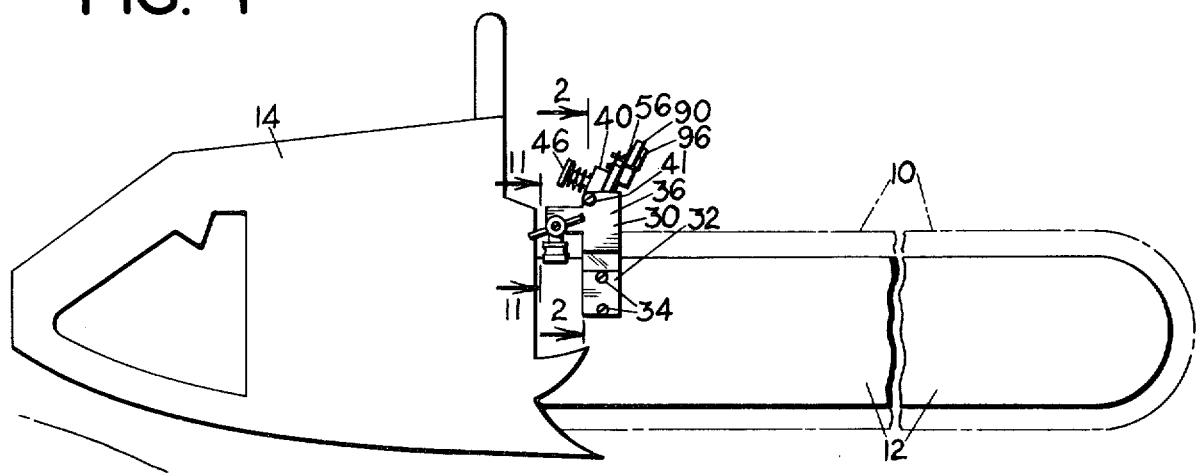
FIG. 1 is a side elevational view of a chain saw showing one form of the present apparatus mounted thereon.
Figure 2:
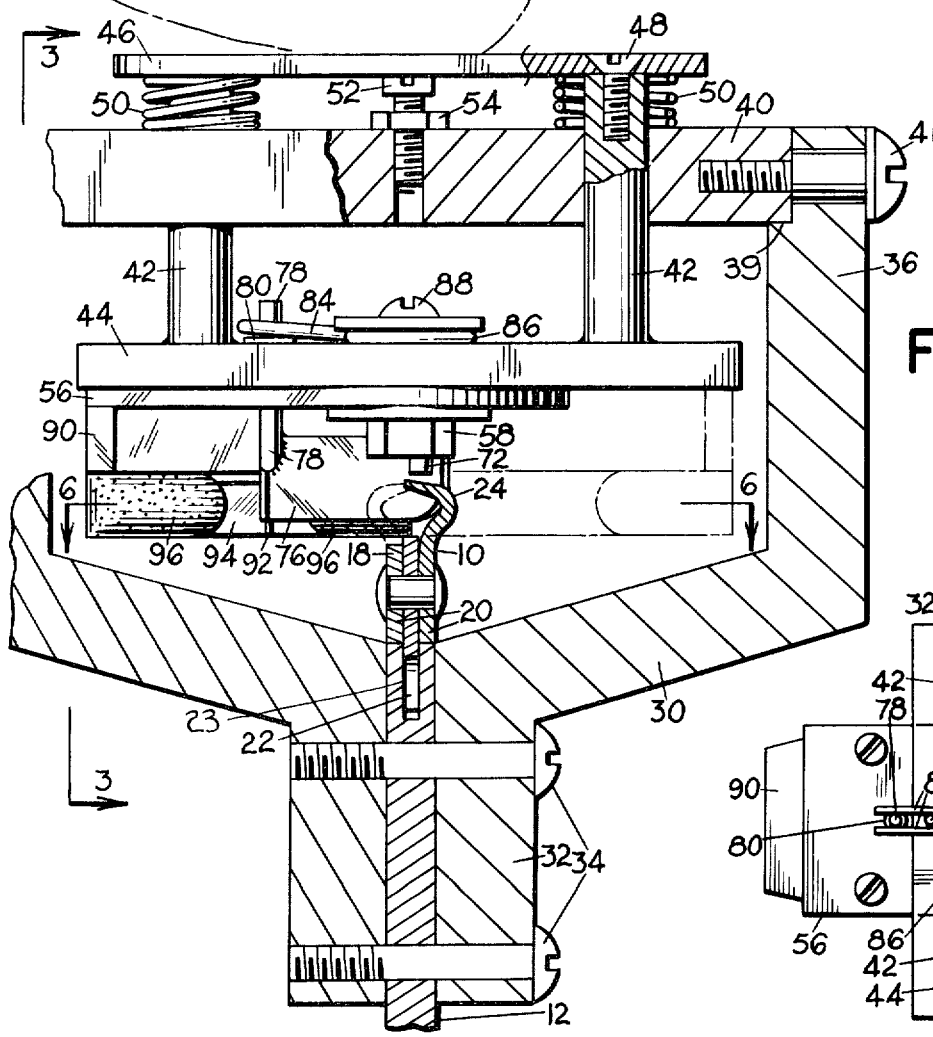
FIG. 2 is an enlarged vertical sectional view taken on the line 2—2 of FIG. 1.

The present sharpener is designed to sharpen the cutter elements of saw chains 10, FIGS. 1 through 6, which operate around saw bars 12, FIGS. 1-3, of chain saw 14. Such chain saws have drive means, not shown, for driving the chain 10, the saw chain being shown in phantom in FIG. 1.

With particular reference again to FIGS. 2-6, the saw chains comprise a plurality of links 18 joined by side plates 20. The links 18 have inwardly extending projections 22, FIG. 3, which provide the drive connection with a drive sprocket of the saw and also provide a guide for the saw chain in a groove 23 around the saw bar. At selected intervals along the chain, the side plates 20 include cutter links having cutter elements or teeth 24 and leading depth gauges 26. The type of cutter elements shown, which are of well known use, have L or hook-shaped cutting surfaces 28. These cutter surfaces face inwardly of the cutter elements and comprise a vertical side surface and a horizontal top surface. These types of cutter elements are known as chipper and chisel type teeth. Adjacent cutter elements on the saw chain have their cutting surfaces facing in opposite directions. As best seen in FIG. 3, the cutter elements taper to a slightly lesser height toward the trailing end thereof.

The device of the invention comprises a bracket 30, FIGS. 1-3, having lower portions 32 adapted to be secured to opposite sides of the saw bar 12 by suitable means, such as screws 34, and upper offset portions 36 parallel with the saw and extending above the latter.

Secured between the upper portions 36 of the bracket 30 and extending laterally over the saw bar is a head 40. This head is supported on the bracket 30 by laterally extending shoulder bolts 41 disposed adjacent the rear of the bracket and providing a pivot connection so that the head 40 can be pivoted between a horizontal use position, FIGS. 2 and 3, and an upwardly inclined out-of-the-way position, FIG. 1. The head 40 is engageable with a shoulder 39 to limit its pivotal movement from its upwardly inclined position to its horizontal use position. A pair of guide posts 42 extend slidably through the head 40 and carry a holder or support plate 44 at their lower ends. The upper ends of the posts 42 project through the head 40 and have a finger-engaging plate 46 attached thereto, as by screws 48. A compression spring 50 is disposed on each post 42 and is confined between the head 40 and the plate 46. These springs urge the plate 46 upwardly which as will be seen hereinafter moves the sharpening elements, to be described, upwardly to a position out of engagement with the saw chain.

A stop screw 52 is threadedly mounted in the head 40 and has a lock nut 54 thereon which serves to set the stop screw at the desired height for selected stop positioning of the plate 46 in its downward movement.

Figure 9:
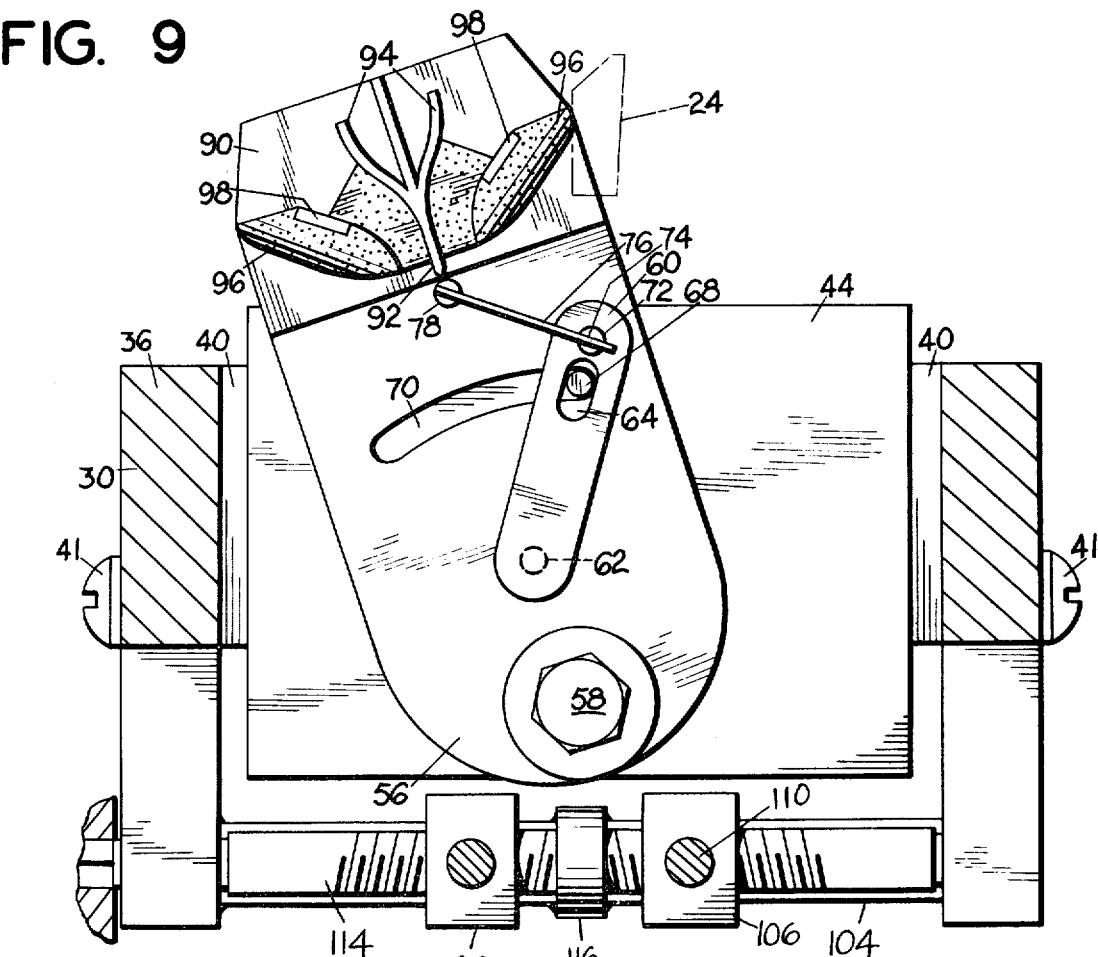
FIG. 9 is a bottom plan view taken on the line 9—9 of FIG. 3, a portion of this view being shown in section.

A plate-like arm 56, FIGS. 2, 3 and 9, lies flush against the underside of holder 44 and is pivotally connected adjacent to its rearward end to a rearward portion of said holder by a vertical shoulder bolt 58. Just forward of the shoulder bolt 58 and lying flush against the underside of arm 56 is an auxiliary arm 60 which has pivotal connection adjacent to its rearward end to the arm 56 by a pivot member 62. Forward of the pivot point 62 the auxiliary arm 60 has a longitudinal slot 64 into which projects a pin 68 secured fixedly in depending relation to the bottom of holder 44. This pin also projects through a laterally extending, arcuate slot 70 in the arm 56. The slot 64 is of a length to allow the pin 68 to work therein as the plate 60 is carried by the pivotal movement of the arm 56.

Figure 10:
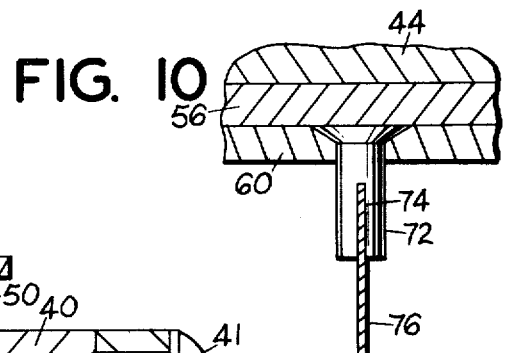
FIG. 10 is an enlarged fragmentary sectional view taken on the line 10—10 of FIG. 3.

Depending from the auxiliary arm 60 forward of the slot 64 is a pin 72. This pin has a pivotal mounting in the arm 60 and has a slot 74 therein, FIGS. 9 and 10, which leads up from the bottom edge and receives a vertical guide baffle or plate 76 integral with and supported by a post 78 at its front. This post extends up through the arm 56 in front of head 44. A keeper 80 on the upper side of arm 56 engages the post 78 for holding the latter in a vertical supported position on the arm 56. Post 78 has pivotal support in the arm 56 so that the guide baffle 76 can swing laterally.

Figure 8:
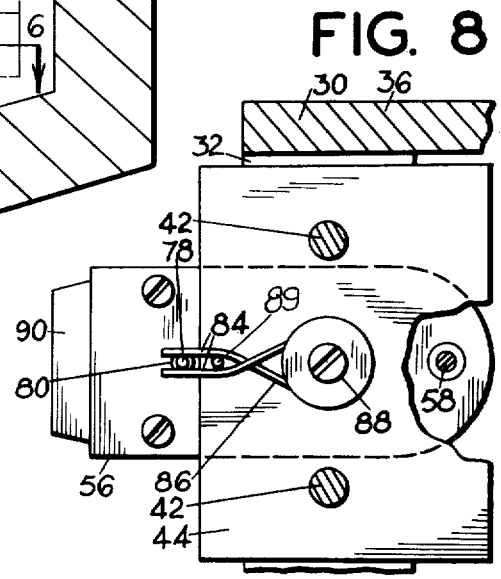
FIG. 8 is a reduced sectional view taken on the line 8—8 of FIG. 3.

This post 78 projects above the top of holder 44 and is disposed between a pair of projecting fingers 84 of a coil spring 86, also seen in FIG. 8, anchored securely on top of holder 44 by an anchor bolt 88. The spring fingers 84 urge the post 78, and therefore the arm 56, into a centered forwardly directed position. The spring fingers 84 will allow pivotal movement of the arm 56 to the sides but when outside forces terminate, such arm will again be directed toward a straight forward position. A stop pin 89 is provided on the head 44 between the spring fingers 84 to provide centering for the arm 56.

With reference to FIG. 9, it will be seen that as the arm 56 swings to one side, the guide baffle 76 can slide longitudinally in pin 72, the post 78 pivoting in the arm as such movement occurs. As the arm 58 so pivots, the guide baffle 76 is pivoted proportionally to a greater angle due to the anchored positioning of said baffle in the pin 72. The slot 64 being elongated allows for the slight longitudinal movement which will occur between the auxiliary arm 60 and the pin 68. As will be seen, the guide baffle 76 insures that the teeth of the saw chain properly engage the sharpening elements, now to be described.

The forward end of arm 56 has a sharpening element support portion 90, FIGS. 2, 3 and 9, secured on the undersurface thereof and this support portion on its undersurface has a longitudinally extending depending guide member 92, also seen in FIGS. 4–6, which leads from the area immediately in front of the guide baffle 76 forwardly to the front end of the spacer portion 90. The guide member 92 has auxiliary guide portions 94 between the ends thereof which extend angularly outwardly and forwardly for a short distance and then bend to a straight forward direction, terminating short of the front end of the sharpening element support portion 90.

Mounted rearwardly and outwardly from the auxiliary portions 94 in an oblique position on the underside of support portion 90 are sharpening elements or stones 96 constructed of conventional grinding material. These sharpening elements 96 are secured integrally in their position by a pair of anchor posts 98 secured to the bottom of support portion 90. The shape of the sharpening elements 96 may vary to correspond with the shape of the cutting surfaces on the cutter elements 24 of the chain, and such shape is illustrated in the cross section view of FIG. 7 wherein the outer surface 96a is substantially round so that when a cutter element 24 moves past the sharpening element in a longitudinal movement the sharpening element will engage the cutting surface 28 and sharpen the L or hook-shape thereof. It is to be understood that the outer surface 96a of the sharpening elements may take any suitable shape so as to sharpen cutting surfaces 28 of selected shapes.

In view of the rearward taper of the cutting elememts 24, as seen in FIG. 3, it is desired that as the tooth is sharpened and thus is shortened from front to back, the top of depth gauge 26 is ground off. For this purpose, the undersurface of support portion 90 on both sides of rail 92 is provided with an abrasive 102, FIG. 9, which the upper edge of the depth gauges 26 engage each time they pass through the sharpener. Thus, as the cutter elements shorten because of repeated sharpenings, the depth gauges also are ground down and thus do not interfere with sharpening of the cutter elements and of course also allow proper functioning of the cutter elements in a sawing operation.

Figure 11:
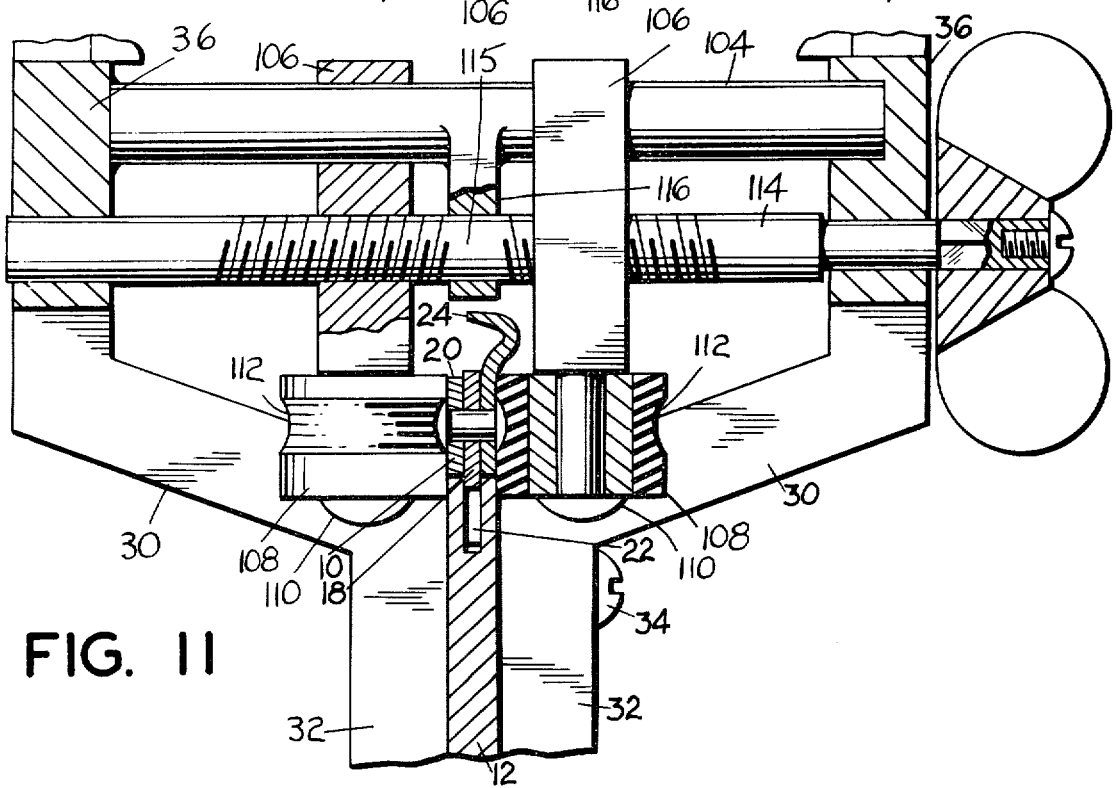
FIG. 11 is an enlarged sectional view taken on the line 11—11 of FIG. 1 showing brake means.

It is desired that the chain travels at a selected and controlled speed, preferably much slower than the normal cutting speed, when the sharpening operation is being accomplished. For this purpose, a brake mechanism is provided, FIG. 11. Such structure comprises a cross piece 104 connected between the brackets 30 and extending laterally over the saw bar. The mechanism is rearwardly of the sharpening apparatus. Slidable on this bar in guided lateral movement is a pair of depending support arms 106 having friction rollers 108 journaled on shafts 110 which project axially from the free ends of the support arms 106. Arms 106 are disposed on opposite sides of the saw bar and their arrangement is such that rollers are adapted to engage opposite sides of the chain. These rollers have peripheral side grooves 112 aligned laterally with the connecting rivets for the links of the chain.

A laterally extending crank screw 114 extends threadably through the supports 106 for the two rollers and has oppositely extending threads for the respective supports 106 so that upon rotation of the screw the supports will either move toward or away from each other. The screw 114 includes an unthreaded portion 115 intermediate its ends which has journaled support in an ear 116 integral with the cross piece 104.

With proper compression of the rollers 108 against opposite sides of the chain, by operation of the crank screw, the speed of the chain can be controlled for the preferred sharpening speed. The grooves 112 being in the plane of the connecting rivets for the chain links, will hold the chain in a horizontal plane and thus prevent any slack in the chain at the sharpening portion from allowing the tooth to wander up away from the saw bar. The teeth will thus always be directed precisely into the sharpening apparatus.

The device is suitably attached to the saw bar in a selected vertical location so that upon downward movement of the holder 44 by the operator as shown in FIG. 2, the sharpening elements 96 are moved into the plane of the cutter elements 24. Preferably, the bracket 30 is mounted as far back on the saw bar 12 toward the saw housing as possible so as to be out of the way of the operation of such bar.

With the saw motor in operation the operator first adjusts screw 114 selectively to provide the desired chain speed. He then swings the sharpening assembly down from its non-use position and presses on the finger plate 46 as shown in FIG. 2, to bring the sharpening elements into the plane of the teeth, the stop screw 52 first having been adjusted to provide the precise down position of the head 44 and the sharpening elements 96. A sharpening sequence is shown in FIGS. 4, 5 and 6 and is as follows:

With reference to FIG. 4, just prior to the engagement of a cutter element 24 with the sharpening element 96, the depth gauge 26 of that cutting element engages the flared portion 94 of the rail member 92, and this causes the arm 56 to pivot to the left. The engagement of depth gauge 26 with the portion 94 of the rail 92 takes the shock of engagement off the sharpening elements 96. As the chain continues its movement, FIG. 5, the depth gauge 26 will clear the flared portion 94 of the rail and the full pivoting force for the arm 56 under the action of spring 86 will hold the cutter element against the sharpening element for sharpening the cutter surfaces 28. FIG. 6 shows the position of the chain in further advanced position wherein the cutter element is past sharpening engagement with the sharpening element 96 and will soon be out of engagement therewith. When the cutter element does leave the sharpening element, the arm 56 will return to its center position under the action of the coil spring 86.

As the chain progresses, the cutter elements will engage alternate sharpening elements 96 in view of the opposite facing of their cutting surfaces 28. The arm 56 swings between the two extreme positions shown in phantom in FIG. 6 as the cutter elements alternately engage the two sharpening elements. As the said cutter elements leave their sharpening element, the arm 56 will swing back immediately under the action of spring 86 as stated above. As the arm 56 swings back, the forward end of the guide rail 92 engages the trailing end of the cutter element that has just been sharpened to prevent over-travelling of the arm in its return.

The purpose of the guide baffle 76 is to insure that the cutter elements properly engage the incoming sharpening elements 96. That is, viewed in FIGS. 4, 5 and 6, as the arm 56 swings in one direction, the guide baffle 76 pivots more proportionately in the same direction with relation to the pivoted movement of arm 56 so that a portion thereof will extend partly across the chain in an intermediate (FIG. 5) position of the arm 56. Such exaggerated pivoted movement is a result of the positioning of its outer end in pin 72 as the arm 56 swings. Thus, as the arm 56 is returning and is about in the position shown in FIG. 5 in a retracting movement, the baffle 76 is in a position to insure that the next cutter element will go to the other side, namely, to the left as viewed in FIG. 5. As the arm 56 swings to the right when this latter cutter element is being sharpened, the baffle 76 will swing across the other way and insure that the next cutter element will engage the right-hand sharpening element, and so forth.

With reference now to FIGS. 12, 13 and 14, an embodiment is illustrated that is removably attachable to a saw bar and when mounted in place on the bar, the sharpening elements are located directly in the path of the cutter elements of the saw chain. The numerals 10 and 12 of FIG. 13 represent the saw chain and the saw bar respectively, as in the first embodiment, such members being shown in phantom. The device of FIG. 12 comprises a bracket 30' integral with a head portion 40'. Bracket 30' has a leg 32' which extends downwardly in offset relation from one side thereof. This leg cooperates with a leg 32a' which extends integrally down from the head 40 on the side opposite from leg 32' in an arrangement such that a saw bar can be received vertically therebetween. Leg 32a' is angled, as seen in FIG. 13, or otherwise disposed so that the lower end thereof is aligned laterally with the lower end of leg 32', and a clamp screw 120 having a turning knob 120a thereon is threadedly supported in a lower portion of the leg 32a'. The clamp screw is adapted to cooperate with the lower portion of leg 32' for releasably clamping the bracket on a saw bar.

Secured to the bottom of head 40', as by screws 121, is a holder or support plate 44'. A sharpening element holding arm 56' underlies the holder 44' and is pivotally connected adjacent one of its ends to said holder by a vertical pivot bolt 58'. An auxiliary arm 60' underlies arm 56' and is pivotally connected adjacent one of its ends, as by means of a pivot pin 62', to said arm 56'. Such structure is similar to that of the first embodiment and employs a pin 68' which is secured vertically in the holder 44' and which projects downwardly through a laterally extending, arcuate slot 70' in the arm 56' as well as into a longitudinally extending slot 64' in the auxiliary arm 60'. A pin 72' is supported rotatably in the auxiliary arm 60' and projects donwardly wherein a slot 74' therein is engaged by a vertical guide baffle or plate 76' integral with and supported by a vertical post 78' at one end. Post 78' extends rotatably up through the arm 56' and receives a keeper 80' thereon to vertically support the post with its lower portion and the guide baffle 76' in depending relation under the auxiliary arm 60'. The upper end of the post 78' is engaged between fingers 84' of a coil spring 86' anchored on the top of the holder 44' by an anchor bolt 88'. As in the first embodiment, the spring fingers 84' urge the arm 56' into a centered forwardly directed position. Pin 68' extends up through the head 44' and serves as the centering means for the spring.

As in the first embodiment the guide baffle 76' is pivoted to a greater angular position relative to the angular movement of the arm 56' as the latter swings from side to side to insure that the teeth of saw chain will properly engage the sharpening elements.

Arm 56' at the forward end thereof has depending side walls 122 which are turned in at 122a to provide pocket support engagement for a sharpening element support portion 90'. In this embodiment, the support portion 90' comprises an insert adapted to be mounted on the arm 56' by front access into the pocket. As best seen in FIG. 14, the insert 90' has bottom longitudinal notches 123 extending along the sides to form wings 124 on the insert which are engageable in the pockets formed by the inturned side wall portions 122a. In a preferred construction the bottom wall of insert 90' has a plate integrally secured thereto, as by any suitable securing means, and this plate has the sharpening elements 96' and a guide member 92' secured thereto. The insert 90' is held in place by a setscrew 128 which if desired may be engageable in a top aperture in the insert 90' to positively locate and hold such insert in place. The insert is thus readily replaceable when necessary and may be discardable. For this latter purpose the main body portion may be plastic or other inexpensive material. Guide member 92' is disposed directly in front of the guide baffle 76' and has auxiliary guide portions 94° between the ends thereof which extend angularly outwardly and forwardly and serve as initial engaging portions for depth gauge portions of the cutting elements to start initial pivotal movement of arm 56'. Guide portions 94' take the shock off sharpening elements or stones 96' and thus are shaped and located as explained in the first embodiment. Sharpening elements 96' are adapted to sharpen cutter elements which are L or hook-shaped. An area 102' on the undersurface of insert 90' between the sharpening elements 96' is provided with an abrasive material to grind down the depth gauges of the cutter elements as the cutter elements shorten from repeated sharpenings.

The embodiment of FIGS. 12–14 is removably attached to the saw bar by the clamp screw 120, and in its attachment it is initially located so that the surfaces to be sharpened on the cutter elements are aligned vertically with the sharpening elements 96'. The device is mounted such that the saw chain in being sharpened moves past the baffle 76' and into the sharpening elements, namely, from right to left in FIG. 13. Such movement is accomplished manually, namely, the operator grasps the chain and pulls it around the bar or it can be run along a log or the like. In such movement of the chain, the cutter elements thereof engage alternate sharpening elements 96', the guide baffle 76' insuring alternate engagement of the cutter elements with the proper sharpening element. A normally worn chain can be sharpened by a rotation thereof around the bar three or four times. The device can be removed from the bar when the saw is in use, but if desired the clamp 120 can be loosened and again tightened with the head angled upward such that the sharpening elements are out of engagement with saw cutter elements.

The present invention thus amounts to a primary improvement in the art in that it is readily mounted on a chain saw without any material alteration of the chain and can sharpen the L or hook-shaped cutter elements, or in other words it can sharpen inside surfaces. Since it is mounted at the rearward end of the bar, it does not interfere with the operation of the saw and furthermore does not encumber the housing of the saw. The structure of the present invention is simplified and thus economical to manufacture and furthermore does not require any particular skill to operate.

Figure 15:
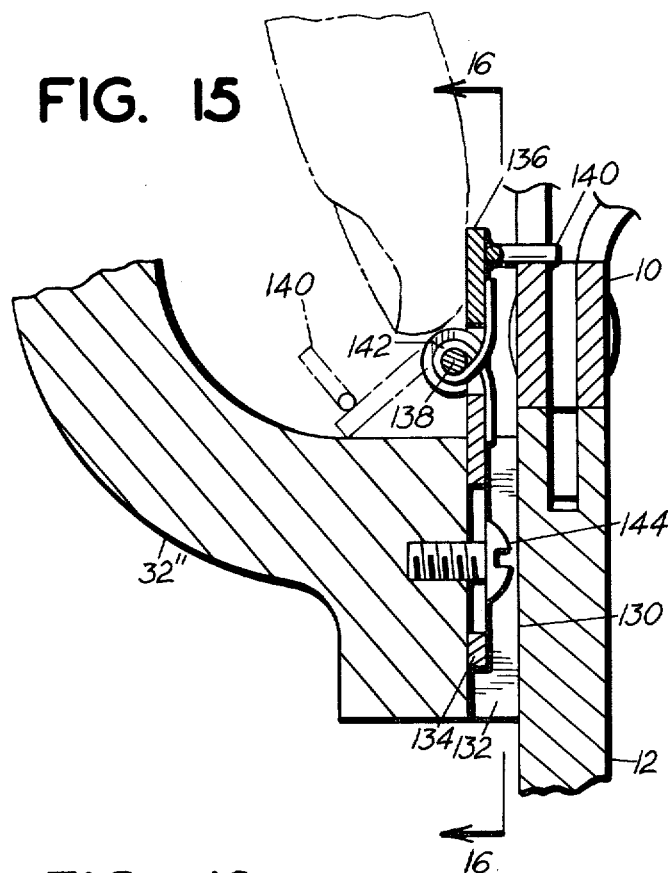
FIG. 15 is a fragmentary sectional view taken on the line 15—15 of FIG. 16 showing positioning means that may be used with clamp-on structure like that shown in FIGS. 12-14.
Figure 16:
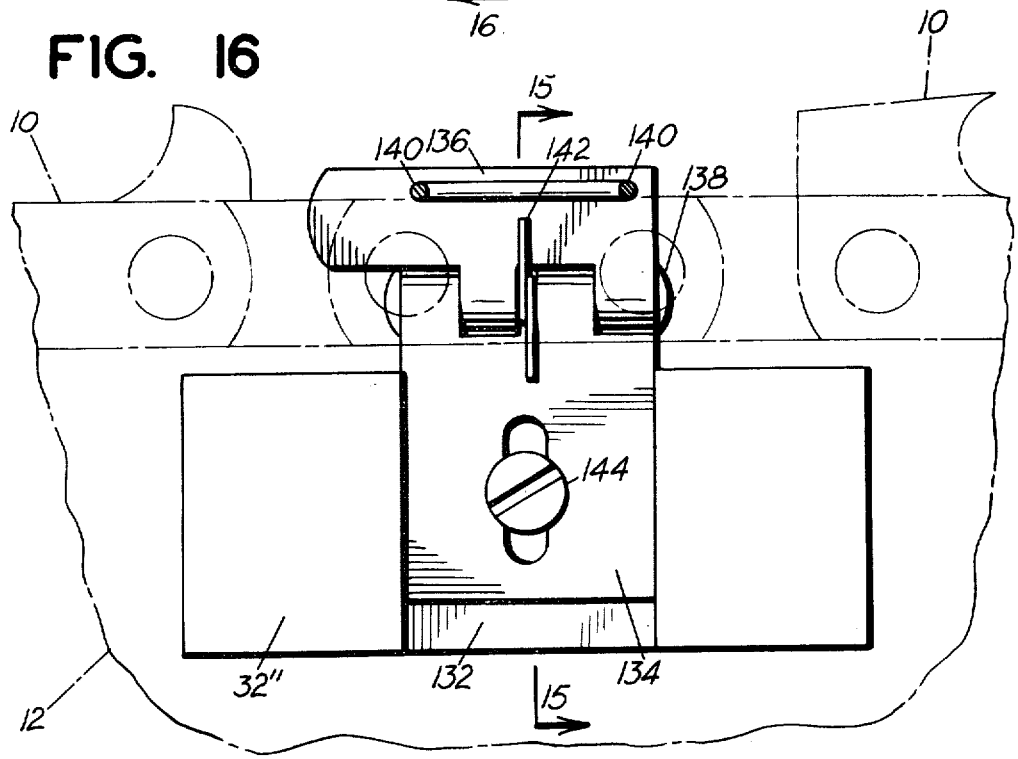
FIG. 16 is a fragmentary elevational view of the positioning means of FIG. 15, this view being taken on the line 16—16 of FIG. 15.

With particular reference to FIGS. 15 and 16, positioning means for properly locating a clamp-on type sharpener vertically on the saw bar is provided. The numeral 32" designates the bottom end of a bracket leg which is combined with a second bracket leg, not shown, similar to that shown in the embodiment of FIGS. 12–14, for attaching the sharpener to a saw bar. Details of the sharpener are not illustrated in FIGS. 15 and 16 as they are substantially identical to that shown in FIGS. 12–14.

An inwardly facing surface 130 on the bracket leg 32" has a vertical groove 132 slidably receiving a plate-like holder 134 for a height gauge 136. Gauge 136 is pivotally supported on the holder 134 by hinge 138 which extends longitudinally relative to the saw bar, and this gauge has fingers 140 projecting at right angles thereto. A coil spring 142 is supported on the hinge 138 and has end fingers engageable with the holder 134 and the gauge 136 in an arrangement such that the latter is normally laid back away from a vertical position, the upright gauging position of the gauge being shown in full lines in FIGS. 15 and 16 and the laid back position thereof being shown in broken lines in FIG. 15.

The holder 134 is held on the bracket leg 32" for vertical adjustment by a screw 144 engaged with said leg and passing through an elongated slot 146 in the holder. In the use of the height gauge, the holder 134 is selectively located vertically by swinging the gauge up against the force of spring 142, and seating the fingers 140 on top of the saw chain 10. The bracket of leg 32" is then clamped on the saw bar, and this will properly locate the sharpener on the bar so that the cutter elements of the chain are efficiently engaged by the sharpening members 96'. Height adjustment of the holder 134 is accomplished by screw 144 to accommodate chains of different body height or other variables. When the operator releases the gauge 136, it will swing back out of the way automatically.

It is to be understood that the forms of our invention herein shown and described are to be taken as preferred examples of the same and that various changes in the shape, size and arrangement of parts may be resorted to without departing from the spirit of our invention, or the scope of the subjoined claims.

Having thus described our invention, we claim:

1. A saw chain sharpener for a chain saw of the type having a saw bar and a saw chain driven around the bar and having oppositely facing cutter elements, said sharpener comprising,
   a. a holder having a chain pass area therein,
   b. a pair of saw sharpening elements on said holder disposed in said chain pass area,
   c. and means arranged to mount said holder on the saw in a position such that the chain on the bar when operating around the bar moves through said chain pass area,
   d. said pair of saw sharpening elements being arranged to have alternate engagement with oppositely facing cutter elements on the saw chain as the latter moves around the bar.

2. The saw chain sharpener of claim 1 wherein each of said saw sharpening elements is shaped to sharpen two tooth edges simultaneously on L-shaped cutter elements.

3. The saw chain sharpener of claim 1 wherein said saw sharpening elements are secured to an arm having pivoted attachment to said holder, said sharpening elements being shaped to sharpen two tooth edges simultaneously on L-shaped cutter elements, said sharpening elements upon being engaged by the cutter elements pivoting said arm laterally.

4. The saw chain sharpener of claim 3 including a longitudinally extending guide wall on said holder between said sharpening elements arranged to guide cutter elements of the saw chain into the respective sharpening elements.

5. The saw chain sharpener of claim 3 including a longitudinally extending guide wall on said holder between said sharpening elements arranged to guide cutter elements of the saw chain into the respective sharpening elements, and auxiliary guide portions on said guide wall arranged for initial engagement by said cutter elements to eliminate the shock of a cutter element coming into engagement with a sharpening element.

6. The saw chain sharpener of claim 3 including an abrasive portion of each side of said guide wall arranged for engagement by the edge of a depth gauge portion of a cutter element and arranged to grind off the depth gauge as the cutter element is ground away by repeated sharpening.

7. The saw chain sharpener of claim 1 including brake means on said holder arranged for engagement with the saw chain to control the speed of the latter in a sharpening operation, and means arranged to mount said brake means on the saw adjacent to said sharpening element, said brake means including a pair of friction rollers engageable at opposite sides of the chain to restrict its speed.

8. The saw chain sharpener of claim 1 wherein said mounting means for said holder includes a head member movable such that said holder is arranged to be moved toward and away from the saw chain, said holder having vertical guide means slidable in said head member, and a finger engaging upper surface on said guide means for engagement by the operator to move the holder.

9. The saw chain sharpener of claim 8 including biasing means acting on said holder and arranged to urge it away from the saw bar whereby normally said holder is positioned away from the saw bar in a nonengageable relation of the sharpening elements with the saw cutter elements.

10. The saw chain sharpener of claim 8 including an adjustable stop of said holder in its movement toward the saw bar to position it properly in the sharpening position of said sharpening elements.

11. A saw chain sharpener for a chain saw having a saw bar and a saw chain driven around the bar, the saw chain being of the type having cutter elements with one or more cutter surfaces facing inwardly of the cutter elements, said sharpener comprising
   a. a holder having a chain pass area therein,
   b. a saw sharpening element on said holder disposed in said chain pass area,
   c. and means arranged to mount said holder on said saw in a position such that the chain on the bar when operating around the bar moves through said chain pass area,
   d. said holder and sharpening element thereon being disposed such that said sharpening element is arrranged to engage the inwardly facing cutter surfaces on the saw chain cutter elements as the saw chain moves around the bar.

12. The saw chain sharpener of claim 11 wherein said saw sharpening elements is arranged to sharpen simultaneously a pair of inwardly directed surfaces on a cutter element.

* * * * *